(12) United States Patent
Yeh et al.

(10) Patent No.: US 7,601,977 B2
(45) Date of Patent: Oct. 13, 2009

(54) PHASE-MATCHED TERAHERTZ EMITTER

(75) Inventors: Ka-Lo Yeh, Singapore (SG); Eric Statz, Somerville, MA (US); Keith A. Nelson, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 350 days.

(21) Appl. No.: 11/638,100

(22) Filed: Dec. 13, 2006

(65) Prior Publication Data

US 2008/0265165 A1 Oct. 30, 2008

Related U.S. Application Data

(60) Provisional application No. 60/750,237, filed on Dec. 13, 2005.

(51) Int. Cl.
*G02F 1/35* (2006.01)
(52) U.S. Cl. .............. 250/504 R; 250/493.1; 359/342; 359/347
(58) Field of Classification Search .......... 250/504 R, 250/504 H, 493.1, 495.1; 359/342, 347
See application file for complete search history.

(56) References Cited

U.S. PATENT DOCUMENTS

| | | | |
|---|---|---|---|
| 4,330,761 A | 5/1982 | Cohn et al. | |
| 4,446,556 A | 5/1984 | Koepf | |
| 5,034,952 A | 7/1991 | Mansfield et al. | |
| 5,112,122 A * | 5/1992 | Chikuma et al. | ............. 359/332 |
| 5,682,262 A | 10/1997 | Wefers et al. | |
| 6,075,640 A | 6/2000 | Nelson | |
| 6,356,349 B1 | 3/2002 | Koehl et al. | |
| 6,844,552 B2 * | 1/2005 | Zhang et al. | ............. 250/338.1 |
| 7,430,074 B2 * | 9/2008 | Korenblit et al. | ............. 359/342 |
| 7,498,593 B2 * | 3/2009 | Shen et al. | ............. 250/504 R |

OTHER PUBLICATIONS

P.Y. Han et al., "Use of the organic crystal DAST for terahertz beam applications", *Optics Letters*, vol. 25, No. 9, pp. 675-677 (May 1, 2000).
The International Search Report and Written Opinion for International Application No. PCT/US2006/047539 dated Jun. 21, 2007.
R.M. Koehl et al.,"Real-space polariton wave packet imaging", *Journal of Chemical Physics*, vol. 110, No. 3, pp. 1317-1320 (Jan. 15, 1999).
N.S. Stoyanov et al., "Terahertz polariton propagation in patterned materials," *Nature Materials*, vol. 1, pp. 95-98 (Oct. 2002).

* cited by examiner

*Primary Examiner*—Jack I Berman
(74) *Attorney, Agent, or Firm*—Fish & Richardson P.C.

(57) ABSTRACT

Methods and apparatus are disclosed for directing optical radiation to make multiple passes across an extended region of an electro-optic material, where during each pass the electro-optic material converts a portion of the optical radiation into terahertz radiation, and where the optical radiation is directed into the electro-optic material to cause an amplitude of the terahertz radiation generated from one or more earlier passes of the optical radiation to be constructively enhanced by the terahertz radiation generated from a later pass of the optical radiation.

47 Claims, 5 Drawing Sheets

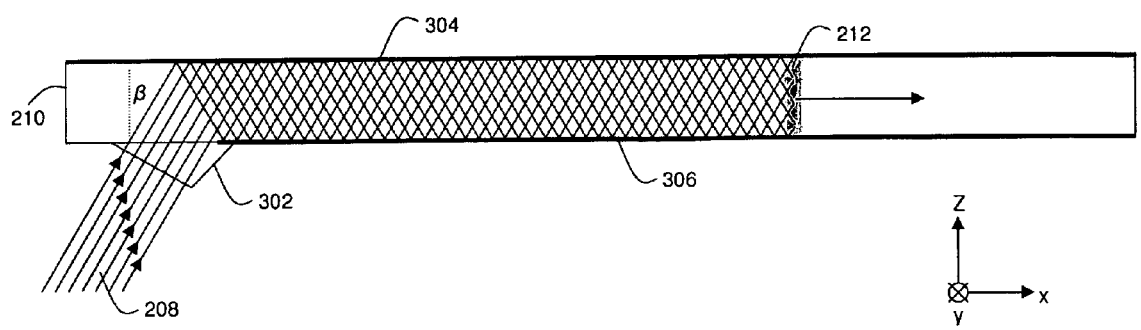
FIG. 5
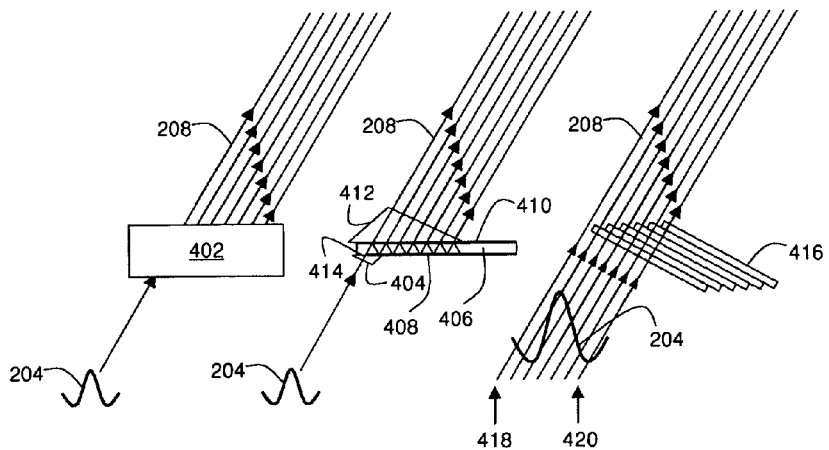
FIG. 6A  FIG. 6B  FIG. 6C

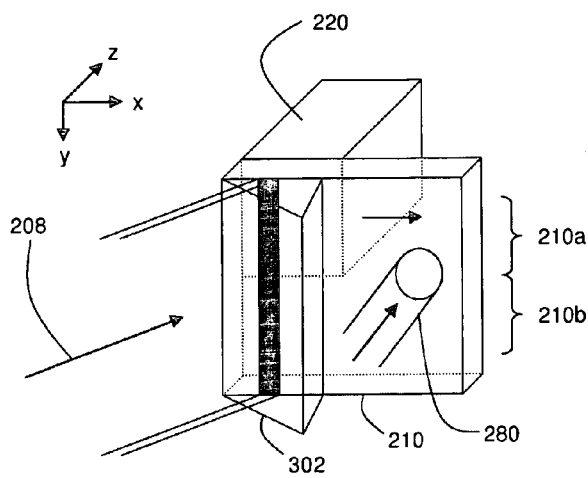
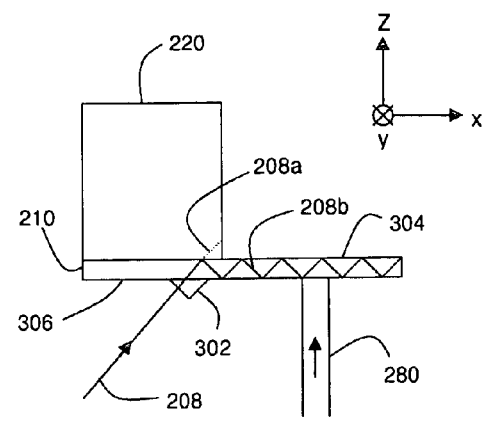
FIG. 9A
FIG. 9B
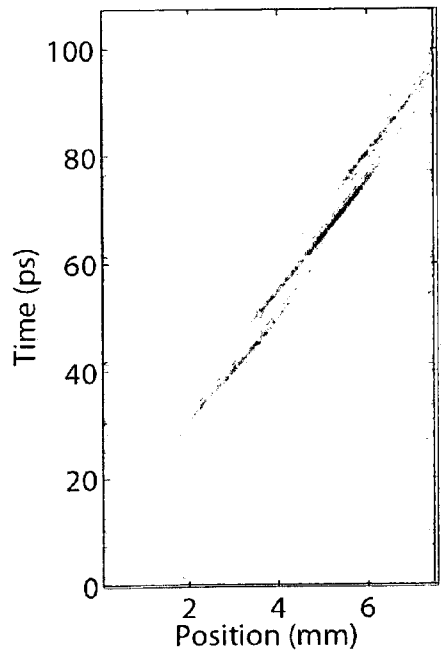
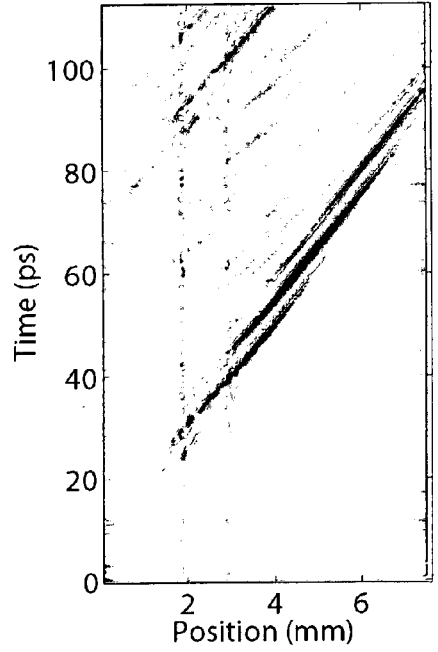
FIG. 10A
FIG. 10B

PHASE-MATCHED TERAHERTZ EMITTER

CROSS-REFERENCE TO RELATED APPLICATIONS

This application claims priority to U.S. Provisional Application No. 60/750,237 entitled "PHASE-MATCHED TERAHERTZ EMITTER" by Ka-Lo Yeh et al., filed on Dec. 13, 2005, the entire contents of which are incorporated herein by reference.

STATEMENT AS TO FEDERALLY SPONSORED RESEARCH

This invention was made with Government support under National Science Foundation grant number CHE-0212375. The Government has certain rights in this invention.

TECHNICAL FIELD

The disclosure relates to radiation sources; for example, the disclosure relates to generation of radiation having frequencies in the terahertz portion of the electromagnetic spectrum.

BACKGROUND

Radiation in the terahertz portion of the electromagnetic spectrum can be generated using a variety of different techniques and physical mechanisms. One such technique for the production of terahertz waves involves nonlinear mixing of optical wave frequency components in an electro-optic material. For example, femtosecond optical pulse irradiation of electro-optic (EO) crystals such as lithium niobate (LN) and lithium tantalate (LT) can be used to generate terahertz phonon-polariton waves, hereafter referred to as "polaritons", which include both electromagnetic and lattice vibrational components, and which propagate through the EO crystal at speeds that are a significant fraction (e.g., typically about 5-25%) of the speed of light in air (c). The polariton phase velocity inside the EO crystal is given by the ratio $c/n_{THz}$, where $n_{THz}$ is the frequency-dependent EO crystal refractive index in the terahertz frequency range for the polariton polarization of interest. When a polariton wave encounters an edge of the EO crystal, it may be partially reflected and partially transmitted through the interface defined by the crystal edge. The medium on the other side of the crystal edge may be air, for example, and the process of polariton generation in an EO crystal may be used as a means for providing free-space terahertz radiation.

A primary mechanism for polariton generation in response to an ultrashort optical pulse is impulsive stimulated Raman scattering (ISRS). The ISRS process involves difference frequency mixing among optical frequency components within the bandwidth of the optical pulse in order to generate terahertz radiation at one or more frequencies that correspond to the optical frequency differences. The spatial and temporal properties of the generated polaritons can be controlled by suitably configuring the temporal and/or spatial profiles of the optical pulse used in the generation of the polaritons, see for example U.S. Pat. No. 6,075,640 entitled "SIGNAL PROCESSING BY OPTICALLY MANIPULATING POLARITONS" by K. A. Nelson, filed on Nov. 25, 1998, the contents of which are incorporated herein by reference. For example, if the optical pulse is focused cylindrically in an EO crystal, the generated polaritons may propagate substantially laterally relative to the direction of propagation of the optical pulse.

FIG. 1 is a schematic diagram showing a plan view of polariton generation in an EO crystal in response to an incident optical pulse. Optical excitation pulse 100, propagating in the z-direction, is incident on EO crystal 102 and cylindrically focused therein. Polariton waves 104 and 106 are generated in response to pulse 100. Each polariton wave propagates substantially laterally (i.e., substantially in the x-direction) with a modest forward component in the z-direction. The forward propagation angle θ is about 25 degrees for ferroelectric EO crystals such as LN and LT, for example. The angle θ is given by the Cherenkov condition.

In general, the process of polariton generation as shown in FIG. 1 is not effectively phase-matched. That is, the terahertz field components of the polariton waves that are generated by the optical pulse as it moves from the front of the EO crystal to the back are not superposed constructively in order to produce a larger field amplitude than the field amplitude generated in any single region of the crystal. The EO crystal's terahertz-region refractive index, $n_{THz}$, is typically larger (e.g., from about $n_{THz}$=4 to about $n_{THz}$=20) than the crystal's optical-region refractive index (e.g., about n=2), and so the optical pulse moves through the crystal at a faster speed than the terahertz polariton. As a result, the terahertz radiation propagates primarily laterally, rather than collinearly and phase-matched with the optical pulse, as would be the case if the refractive index values n and $n_{THz}$ were equal. In some EO crystals such as ZnTe, the condition $n=n_{THz}$ can be realized at particular optical and terahertz frequencies. However, in ferroelectric, high-dielectric crystals such as LN and LT, the above condition is generally not attained.

Although the disparity in optical and terahertz refractive indices typically prevents phase-matching in high-dielectric materials, the lateral propagation of the polariton response offers certain advantages. For example, the terahertz polariton field is conveniently accessible to additional optical pulses that can be used for probing the terahertz field characteristics, including real-space imaging of the terahertz field. Additional optical pulses can also be used in order to manipulate the terahertz polariton field as it propagates.

In addition, the EO crystal can be patterned with functional elements including terahertz waveguides, resonators, gratings, and other structures into which the polariton wave can be directed, enabling terahertz field guidance and control. Such structures are disclosed, for example, in "Terahertz polariton propagation in patterned materials," *Nature Materials* 725: 95-98 (2002) by N. S. Stoyanov et al., the contents of which are incorporated herein by reference. Additional materials can be embedded within or placed adjacent to the EO crystal and/or its patterned features in order to create multifunctional hybrid structures that make use of the terahertz fields. These and similar capabilities, taken together, have been labeled "polaritonics" to suggest a broadly applicable platform for terahertz signal generation, control, guidance, use, and measurement. Without phase-matching, however, the efficiency of terahertz radiation generation is low. Therefore, a method for effective phase-matching of terahertz radiation generation in high-dielectric EO materials is of importance in practical terahertz signal processing applications, and also in scientific applications of terahertz radiation, including linear and nonlinear terahertz spectroscopy.

SUMMARY

In general, in a first aspect, an electro-optic material for use with a source of optical radiation that directs the optical radiation to make multiple passes across an extended region of the electro-optic material is disclosed, the electro-optic material is configured such that during each pass the electro-optic material converts a portion of the optical radiation into terahertz radiation and further configured such that an amplitude of the terahertz radiation generated from one or more earlier passes of the optical radiation is constructively enhanced by the terahertz radiation generated from a later pass of the optical radiation.

Embodiments of the electro-optic material are described further below in connection with the method and apparatus aspects that follow.

In another aspect, a method is disclosed that comprises directing optical radiation to make multiple passes across an extended region of an electro-optic material, where during each pass the electro-optic material converts a portion of the optical radiation into terahertz radiation, and where the optical radiation is directed into the electro-optic material to cause an amplitude of the terahertz radiation generated from one or more earlier passes of the optical radiation to be constructively enhanced by the terahertz radiation generated from a later pass of the optical radiation.

Embodiments of the method may include any of the following features.

An amplitude of the terahertz radiation generated from the one or more earlier passes may be constructively enhanced by the terahertz radiation generated from each of multiple later passes of the optical radiation through the electro-optic material.

The optical radiation may be directed to reflect from one or more surfaces of the electro-optic material to cause the multiple passes of the optical radiation across the extended region of the electro-optic material. Further, the optical radiation may be directed to reflect from opposite surfaces of the electro-optic material to cause the multiple passes of the optical radiation across the extended region of the electro-optic material. The opposite surfaces of the electro-optic material may be parallel. A portion of each of the one or more surfaces may be coated to increase the reflectivity of the optical radiation from the corresponding surfaces of the electro-optic material.

The optical radiation may be directed into the electro-optic material at an angle relative to a surface from which it reflects that causes the terahertz radiation generated from each pass to propagate in a common direction. A critical angle for total internal reflection of the optical radiation from the surface is $\theta_c$, and the angle of the optical radiation relative to the surface may be $0.8\theta_c$ or more (e.g, $\theta_c$ or more). The angle may further cause the optical radiation reflected for each later pass to overlap with propagating terahertz radiation generated from one or more earlier passes. The angle may be complementary to an angle that corresponds to the Cherenkov condition. For example, the angle may be in a range from about 15 degrees to about 35 degrees. Alternatively, the angle may be in a range from about 1 degree to about 14 degrees. As another alternative, the angle may be larger than about 35 degrees.

The amplitude of the constructively enhanced terahertz radiation may be larger than the amplitude of terahertz radiation generated from a single pass of the optical radiation across the extended region of the electro-optic material. For example, the amplitude of the constructively enhanced terahertz radiation may be at least twice as large as the amplitude of terahertz radiation generated from a single pass of the optical radiation across the extended region of the electro-optic material. The amplitude of the terahertz radiation generated from the one or more earlier passes of the optical radiation may be increased by a factor of 1.1 or more by the terahertz radiation generated from a later pass of the optical radiation.

The multiple passes may include 2 or more passes. For example, the multiple passes may include 3 or more passes, 10 or more passes.

The reflecting surfaces of the material may be separated by less than about 100 microns. Alternatively, the reflecting surfaces of the material may be separated by more than about 100 microns.

Surfaces of the electro-optic crystal that are nominally perpendicular to the reflecting surfaces and parallel to the direction of propagation of the terahertz radiation may be separated by more than about 100 microns. Alternatively, surfaces of the electro-optic crystal that are nominally perpendicular to the reflecting surfaces and parallel to the direction of propagation of the terahertz radiation may be separated by less than about 100 microns.

The optical radiation may include a single beam that includes a single optical pulse having a temporal duration that is short relative to a temporal duration of a single-cycle terahertz output pulse.

The optical radiation may include a single beam that includes multiple optical pulses, each one of the multiple pulses having a regular temporal spacing from a previous one of the multiple pulses, where the temporal interval between a first one of the multiple pulses and a last one of the multiple pulses is less than a nanosecond, and where each one of the multiple pulses has a temporal duration that is short relative to a temporal duration of a single cycle of a multiple-cycle terahertz output waveform having a frequency determined by an inverse of the regular temporal spacing of the multiple optical pulses.

The optical radiation may include a single beam that includes multiple optical pulses, each one of the multiple optical pulses having a temporal duration that is short relative to the temporal duration of a single cycle or feature of an output terahertz waveform, where the temporal duration of the terahertz waveform is less than a nanosecond.

The optical radiation may include a single beam that includes multiple optical pulses, each one of the multiple optical pulses having a temporal duration that is short relative to a duration of a single cycle or feature of an output terahertz waveform, where the temporal spacing between the multiple optical pulses produces quasi-continuous terahertz radiation.

The optical radiation may include multiple, spatially separated beams each having at least one optical pulse, where the temporal interval between a first one of the optical pulses and a last one of the optical pulses is less than about a nanosecond.

The optical radiation may include one or more additional optical pulses introduced into the electro-optic crystal at positions along the extended region of the crystal and configured to further cause an amplitude of terahertz radiation generated from one or more earlier passes of the optical radiation to be constructively enhanced by terahertz radiation generated from the one or more additional optical pulses. Alternatively, or in addition, the one or more additional optical pulses may be used to generate additional terahertz radiation that may or may not be constructively superposed with terahertz radiation generated from one or more earlier passes of optical radiation through the extended region of the crystal.

Each of the pulses in a single beam may be displaced spatially and temporally from a corresponding pulse in another beam to constructively enhance an amplitude of terahertz radiation generated by the other beam.

The optical radiation may be directed into the material to form an optical interference pattern for each pass, where the pattern spacing and orientation determine the wavelength of the generated terahertz radiation inside the electro-optic material.

The terahertz radiation may propagate within the electro-optic material as an optic phonon-polariton wave having lattice vibrational and electromagnetic wave components.

The optical radiation may be directed into the material through a prism or a grating.

The optical radiation may be directed into the material through a surface of the material that is cut or beveled so that the angle of incidence of the optical radiation at the crystal surface is a near-normal angle of incidence (e.g., the angle of incidence is 90° or less, 88° or less, 86° or less, 84° or less, 82° or less, 80° or less, 78° or less, 75° or less, 70° or less).

The optical radiation may be directed to enter the electro-optic material through one or more surfaces of the electro-optic material that are coated with an anti-reflection material. That is, the anti-reflection coating may be configured to reduce an intensity of a portion of the optical radiation that is reflected from the surface of the material. The anti-reflection coating may be configured to reduce the intensity of the reflected portion of the optical radiation for a range of angles of incidence of the optical radiation on the surface of the electro-optic material. Alternatively, or in addition, the anti-reflection coating may be configured to reduce the intensity of the reflected portion of the optical radiation for a range of wavelengths of the optical radiation incident on the surface of the electro-optic material.

Optical radiation may escape from one or more positions along the extended region of the crystal following multiple passes across the extended region. The escaping optical radiation may be collimated or focused after escaping from the electro-optic material. The collimated or focused optical radiation may be further directed to re-enter the electro-optic material to cause an amplitude of the terahertz radiation generated from one or more earlier passes of the optical radiation to be constructively enhanced by terahertz radiation generated using the collimated or focused optical radiation. Alternatively, or in addition, the collimated or focused optical radiation may be further directed to re-enter the electro-optic material to generate additional terahertz radiation, and the additional terahertz radiation may or may not be constructively superposed with terahertz radiation generated from one or more earlier passes of optical radiation through the extended region of the crystal. The focused optical radiation may be used to further amplify the terahertz radiation generated by the initial passes of the optical radiation through the extended region of the electro-optic material, or the focused optical radiation may be used to generate additional terahertz radiation in the electro-optic material in the form of one or more additional terahertz fields.

The terahertz radiation may be coupled out of a front, back, or side surface of the electro-optic material.

Propagating terahertz radiation from the multiple passes of the optical radiation across an extended region of the electro-optic material may be monitored. The propagating terahertz radiation may be monitored when the terahertz radiation is within the electro-optic material. Additional optical radiation may be directed to the electro-optic material to monitor the terahertz radiation. Alternatively, or in addition, the propagating terahertz radiation may be monitored after it has passed out of the electro-optic material. A bolometer or pyroelectric detector may be used to monitor the terahertz radiation.

The method can further include adjusting an angle at which the optical radiation is directed into the electro-optic material based on the monitored terahertz radiation to improve the conversion efficiency of the optical radiation making the multiple passes to generate the propagating terahertz radiation.

The electro-optic material may include at least one of a lithium tantalate crystal, a lithium niobate crystal, a strontium barium titanate crystal, and a lead lanthanum zirconate titanate crystal.

The spatiotemporal profile of the optical radiation may be adjusted to improve the conversion efficiency of the optical radiation making the multiple passes to generate the propagating terahertz radiation. Alternatively, or in addition, the spatiotemporal profile of the optical radiation may be adjusted to control the spatiotemporal profile of the propagating terahertz radiation.

In another aspect, an apparatus is disclosed that comprises an electro-optic material for converting optical radiation into terahertz radiation, and a source of optical radiation, the source being configured to direct the optical radiation to make multiple passes across an extended region of the electro-optic material, where during each pass the electro-optic material converts a portion of the optical radiation into terahertz radiation, and where the source is further configured to direct the optical radiation into the electro-optic material to cause an amplitude of the terahertz radiation generated from one or more earlier passes of the optical radiation to be constructively enhanced by the terahertz radiation generated from a later pass of the optical radiation.

Embodiments of the apparatus may have any of the following features.

The source may include a laser source and beam-directing optics for directing optical radiation produced by the laser source to the electro-optic material.

The optical radiation may be directed to reflect from one or more surfaces of the electro-optic material to cause the multiple passes of the optical radiation across the extended region of the electro-optic material. A critical angle for total internal reflection of the optical radiation at the one or more surfaces is $\theta_c$, and the optical radiation can be incident on the one or more surfaces at an angle of $0.8\theta_c$ or more (e.g., $\theta_c$ or more). The optical radiation may be directed to reflect from opposite surfaces of the electro-optic material to cause the multiple passes of the optical radiation across the extended region of the electro-optic material. The opposite surfaces may be parallel. A portion of each of the one or more surfaces of the electro-optic material may be coated to increase the reflectivity of the optical radiation from the corresponding surfaces of the electro-optic material.

The amplitude of the constructively enhanced terahertz radiation can be larger than the amplitude of terahertz radiation generated from a single pass of the optical radiation across the extended region of the electro-optic material. For example, the amplitude of the constructively enhanced terahertz radiation can be at least twice as large as the amplitude of terahertz radiation generated from a single pass of the optical radiation across the extended region of the electro-optic material. The amplitude of the terahertz radiation generated from the one or more earlier passes of the optical radiation can be increased by a factor of 1.1 or more by the terahertz radiation generated from a later pass of the optical radiation.

One or more surfaces of the electro-optic material through which optical radiation enters the electro-optic material may be coated with an anti-reflection material.

The electro-optic material may include at least one of a lithium tantalate crystal, a lithium niobate crystal, a strontium barium titanate crystal, and a lead lanthanum zirconate titanate crystal.

The apparatus may also include other suitable features that are similar to features of the method enumerated above.

Unless otherwise defined, all technical and scientific terms used herein have the same meaning as commonly understood by one of ordinary skill in the art to which this disclosure belongs. In case of conflict between documents incorporated herein by reference and the present specification, the present specification will control.

The details of one or more embodiments are set forth in the accompanying drawings and the description below. Other features and advantages will be apparent from the description, drawings, and claims.

DESCRIPTION OF DRAWINGS

FIG. 5 is a schematic diagram showing a plan view of phase-matched terahertz radiation generation in an EO crystal using multiple spatially and temporally offset optical pulses.

FIGS. 6A-C are plan views of three different methods for generating multiple spatially and temporally offset optical pulses from a single optical pulse.

FIGS. 9A and 9B are perspective and plan views, respectively, of an experimental arrangement for determining the extent of amplification of a terahertz radiation field using multiple reflections of a pump beam in an EO crystal.

FIGS. 10A and 10B are space-time plots showing terahertz radiation fields produced via a single pass and multiple passes, respectively, of a pump beam in an EO crystal.

Like reference symbols in the various drawings indicate like elements.

DETAILED DESCRIPTION

The present disclosure provides a simple and effective method for terahertz radiation generation with phase-matching in high-dielectric EO materials. As employed in this disclosure, the term "terahertz radiation" refers to radiation generated via a nonlinear optical process, such as difference frequency mixing via ISRS, in a material. In general, multiple different nonlinear optical processes can be employed to generate terahertz radiation. One or more optical pulses, or more generally an optical excitation waveform, may be used to produce the terahertz radiation, which corresponds generally to the temporal and/or spatial intensity profile of the optical excitation waveform. In general, "terahertz radiation" includes radiation produced via these processes and having a frequency in a range from about 0.02 THz to about 20 THz.

Further, as employed in this disclosure, "optical radiation" refers to radiation having a wavelength in a portion of the electromagnetic spectrum corresponding to ultraviolet light, visible light, or near-infrared light. Optical radiation can have one or more wavelengths in a range from about 200 nm to about 2000 nm.

Figure 1:
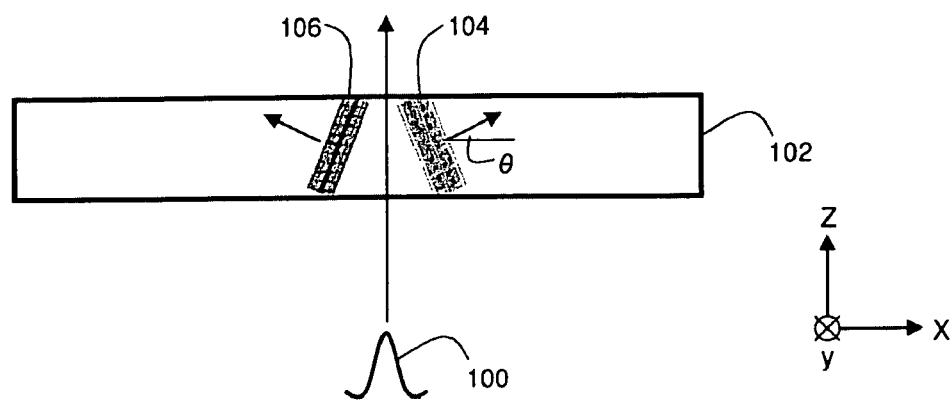
FIG. 1 is a schematic diagram showing a plan view of terahertz polariton generation in an EO crystal using an ultrashort optical pulse.
Figure 2:
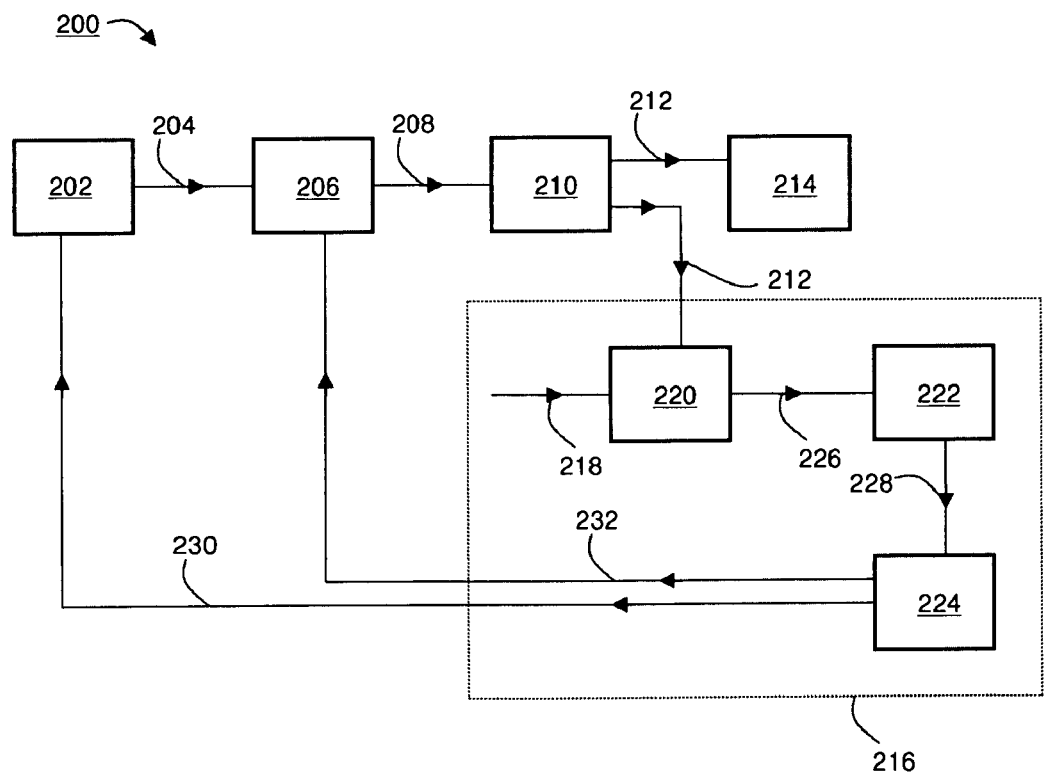
FIG. 2 is a schematic diagram of a system for terahertz radiation generation.

FIG. 2 is a schematic illustration of a system 200 that implements the phase-matching scheme. System 200 includes a source 202 that provides optical radiation in the form of an optical waveform 204 to beam conditioning optics (BCO) 206. Beam conditioning optics 206 can be configured to modify one or more of the spatial profile, temporal profile, and propagation direction of optical waveform 204 to produce incident waveform 208, which is directed by beam conditioning optics 206 to be incident on terahertz generation medium (TGM) 210. TGM 210 is configured to produce, by one or more mechanisms, terahertz radiation 212. Terahertz radiation 212 can then be directed to an application 214 as desired. The generated terahertz radiation may alternatively or additionally be directed to a measurement system 216.

Source 202 generally includes any of a variety of sources that produce optical waveforms. For example, source 202 can be a laser, such as a pulsed laser providing ultrashort optical pulses. The ultrashort optical pulses can have a temporal duration that is less than about 500 fs (e.g., less than about 250 fs, less than about 100 fs, less than about 50 fs, less than about 25 fs). The ultrashort optical pulses can further have optical frequencies that correspond to optical wavelengths in the ultraviolet, visible, and near-infrared regions of the electromagnetic spectrum. For example, the ultrashort optical pulses can have optical wavelengths in a region from about 200 nm to about 2000 nm. In some embodiments, for example, source 202 is a titanium sapphire based laser system producing optical pulses having durations shorter than about 100 fs, and having central wavelengths from about 750 nm to about 850 nm. In some embodiments, source 202 is an erbium fiber laser producing optical pulses having central wavelengths of about 1550 nm. Other embodiments may include other sources, such as other laser sources, for example.

The repetition rate of source 202 can also be varied as desired. For example, a titanium sapphire source can provide optical pulses at a repetition rate from about 10 Hz to about 100 MHz. An erbium fiber laser can provide optical pulses at repetition rates from about 100 kHz to about 20 GHz, for example. In general, source 202 may be selected to provide a wide variety of repetition rates. In addition, source 202 can be configured to provide a range of optical pulse energies. For example, at a repetition rate of 10 Hz, optical pulses can be provided having a range of pulse energies from about 1 mJ to about 100 mJ or higher. At higher repetition rates, for example, optical pulse energies can be provided with significantly lower energies, such as energies of about 1 nJ, for example.

Further, the duration of optical pulses derived from source 202 can vary within a wide range. In general, for efficient ISRS-based generation of terahertz radiation, the optical pulse duration is maintained less than a period of the terahertz radiation, or less than a temporal duration of a feature of the terahertz radiation. For most terahertz frequencies of interest, therefore, optical pulse durations should generally be less than about 5 ps, and can in some cases be significantly less than 5 ps (e.g., optical pulse durations may be less than 500 fs, or less than 250 fs, or less than 100 fs, or less than 50 fs, or less than 25 fs, or even less). Terahertz frequencies of interest generally fall within a range of about 0.02 THz to about 20 THz. In some embodiments, particularly efficient terahertz radiation generation is observed in a frequency region from about 0.1 THz to about 3 THz, for example.

BCO 206 generally includes any of a variety of optical devices and elements for manipulating optical waveforms.

For example, BCO 206 can include elements for changing the propagation direction of an optical waveform, such as mirrors, lenses, prisms, gratings, and the like. Any of these elements can be mounted on translatable and/or rotatable stages to provide for positioning of the elements. The translatable and/or rotatable stages may further be manually adjustable, or include components that provide for automatic position adjustment in response to electronic control signals.

BCO 206 can also include optical elements and devices for modulating the spatial and temporal profiles of optical waveform 204. Such elements and devices can include, for example, spatial light modulators (e.g., liquid crystal light modulators, MEMS based reflective modulators), light masks, diffractive optical elements, and similar devices. Spatial light modulators suitable for modulating the spatial and temporal profiles of optical waveform 204 are disclosed, for example, in U.S. Pat. No. 5,682,262 entitled "METHOD AND DEVICE FOR GENERATING SPATIALLY AND TEMPORALLY SHAPED OPTICAL WAVEFORMS" by Marc M. Wefers and Keith A. Nelson, filed on Dec. 13, 1995, the contents of which are incorporated herein by reference. These devices can be incorporated into optical pulse shaping apparatus to provide for spatiotemporal shaping of optical waveform 204 in order to produce a desired incident waveform 208. Incident waveform 208 may then be directed to be incident on TGM 210 in a preferred direction by other elements of BCO 206.

TGM 210 generally includes one or more materials that produce terahertz radiation in response to irradiation by incident waveform 208. TGM 210 can include materials such as lithium niobate (LN) and lithium tantalate (LT) crystals. In addition, other high dielectric materials may be included in TGM 210. For example, in some embodiments, TGM 210 can include materials such as strontium barium titanate (SBN) and lead lanthanum zirconate titanate (PLZT). TGM 210 can further include patterned structures such as waveguides, resonators, gratings, and other structures to provide for control, guidance, and manipulation of the generated terahertz radiation. These patterned structures can be produced in TGM 210 using a variety of processes such as ion etching and femtosecond laser micro-machining, for example. In addition, the edges of TGM 210, which can be produced through conventional cutting and polishing processes, can function in some embodiments as portions of waveguides, resonators, and other elements.

Terahertz radiation 212 produced in TGM 210 can be directed to one or more applications 214 including spectroscopic applications such as linear terahertz absorption measurements, nonlinear terahertz wave mixing measurements, terahertz reflectance measurements, terahertz imaging measurements, and others. For example, terahertz radiation 212 may be used in a handheld spectrometer system to monitor water quality, or in a microfluidic system to measure concentrations of components in biological substances. In some embodiments, the generated terahertz radiation may be used in scanner devices used to detect pathogens or explosive materials, for example.

Alternatively, or in addition, a portion of terahertz radiation 212 can be directed to measurement system 216. Measurement system 216 can include, for example, an optical probe beam 218, a measurement crystal 220, a detector 222, and an electronic processor 224. In some embodiments, a portion of terahertz radiation 212 is directed into measurement crystal 220 (e.g., a crystal such as LN or LT) and optical probe beam 218 is directed to pass through a region of the measurement crystal while the terahertz radiation is present therein. The optical probe beam is modulated by the terahertz radiation, and modulated optical probe beam 226 is detected by detector 222 (e.g., a CCD camera, a photodiode, or a photomultiplier tube) using methods such as those disclosed in, for example, U.S. Pat. No. 6,356,349 entitled "POLARITON WAVE IMAGING" by Richard A. Koehl et al., filed on Jul. 9, 1999, the contents of which are incorporated herein by reference. Other methods for terahertz radiation detection, such as methods that include probing in one or more additional electro-optic crystals, methods that include using a stripline antenna structure on a semiconductor wafer, and methods that include the use of a bolometer, can also be used. Detector 222 transforms the optical signal due to modulated optical probe beam 226 into electrical signal 228, which is provided by detector 222 to electronic processor 224.

Electronic processor 224 can include, for example, a logic processor, an interface, and signal generation electronics. Electronic processor 224 can be configured to provide control signals 230 and 232 to source 202 and BCO 206 in order to adjust or regulate the properties of terahertz radiation 212 produced by system 200. For example, electronic processor 224 can provide control signals 232 to BCO 206 to adjust the angle of incidence of incident waveform 208 on TGM 210 in order to increase or decrease the intensity of terahertz radiation 212 produced by system 200. Electronic processor 224 can also be configured to provide other control signals. For example, electronic processor 224 can provide control signals 230 and/or 232 to source 202 and/or BCO 206 in order to modify properties such as the spatial and temporal profiles of incident waveform 208 and the spectral properties of waveform 208. Any of the control signals provided by electronic processor 224 can be implemented as part of a feedback loop, wherein the configuration of source 202 and/or BCO 206 is adjusted iteratively to produce terahertz radiation 212 having a desired set of characteristics.

The elements of system 200 have been generally described above. Embodiments that provide for phase-matched terahertz radiation generation can include any of the features or elements enumerated, and may include further elements and/or features. These are discussed below with reference to system 200.

Figure 3:
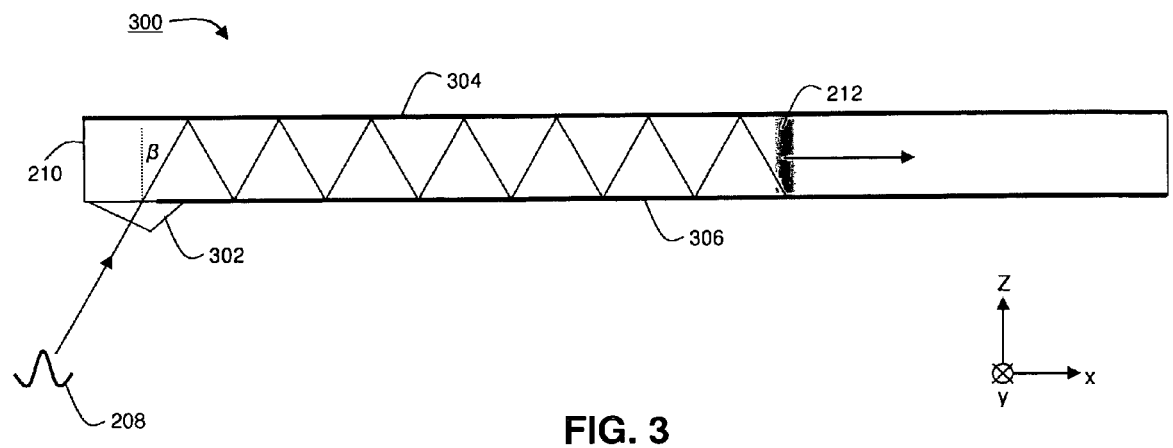
FIG. 3 is a schematic diagram showing a plan view of phase-matched terahertz radiation generation in an EO crystal.

FIG. 3 shows a schematic diagram of an embodiment of a system 300 for implementing phase-matched terahertz radiation generation. Incident waveform 208, which includes a femtosecond optical pulse, is cylindrically focused and directed by prism 302 to be incident on TGM 210. TGM 210 includes an EO crystal such as, for example, LN or LT. Prism 302 is configured to direct incident waveform 208 to enter the EO crystal such that the waveform propagates through the crystal at an angle $\beta$ to a surface normal. Other embodiments can employ different means to provide for a selected propagation angle $\beta$. For example, in some embodiments, a beveled entry interface of TGM 210 can be provided, where the angle of the beveled interface is chosen to permit a propagation angle $\beta$ of incident waveform 208. The beveled interface is integrally formed in TGM 210 by cutting TGM 210 at one or more appropriate angles, for example. Alternatively, for example, incident waveform 208 can simply be directed by BCO 206 to be incident on the surface of TGM 210 at a large angle to a surface normal in order to provide for the correct internal propagation angle after refraction occurs at the crystal interface. The portion of front surface 306 of the crystal can be coated with an anti-reflection coating, for example, in order to promote efficient coupling of optical radiation into TGM 210.

In general, the angle $\beta$ is selected by suitably configuring prism 302 and/or BCO 206 to direct incident waveform 208 to enter TGM 210 along a chosen direction. The generated terahertz radiation 212 propagates laterally in the x-direction, with the usual forward propagation component relative to the incident waveform propagation direction, but with no forward component relative to the front surface 306 or the back surface 304 of the EO crystal, i.e., no component in the z-direction.

In practice, the angle β can be calculated for a given TGM 210 if the group velocity $v_g$ of incident waveform 208 in TGM 210 is known, and if the phase velocity $v_p$ of the terahertz radiation field in TGM 210 is known. Parameters $v_g$ and $v_p$ can be obtained either from a general reference source, or the values of these parameters can be measured for a particular material of interest. Incident waveform 208 and terahertz radiation 212 propagate at an angle θ with respect to one another, where θ is referred to as the Cherenkov angle. The Cherenkov angle can be calculated for TGM 210 using the relation $$\cos\theta = \frac{v_p}{v_g} \quad (1)$$

The angles β and θ are complementary. Therefore, the angle β is given, in degrees, by the expression $$\beta = 90 - \cos^{-1}\left(\frac{v_p}{v_g}\right) = \sin^{-1}\left(\frac{v_p}{v_g}\right) \quad (2)$$

Figure 4:
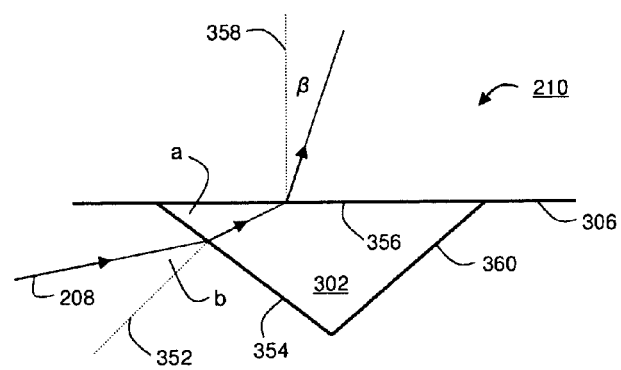
FIG. 4 is a schematic diagram showing a plan view of the geometrical arrangement of a prism used to direct an incident waveform into a material for the generation of terahertz radiation.

In some embodiments, such as the embodiment of FIG. 3 for example, a prism is used to direct incident waveform 208 into TGM 210 at the proper angle β for phase-matched terahertz generation. FIG. 4 is a schematic diagram showing a plan view of the geometrical relation of prism 302, incident waveform 208, and TGM 210. Prism 302 includes an optical entry interface 354 having surface normal 352 and an optical exit interface 356 having surface normal 358 (which is also a surface normal to front surface 306 of TGM 210). Prism 302 is a right-angled prism, with entry interface 354 and interface 360 forming a 90 degree angle. Incident waveform 208 refracts on passing through optical entry interface 354, and again on passing through optical exit interface 356, and enters TGM 210 at an angle β to surface normal 358, where β is given by Equation (2). The prism angle between optical entry interface 354 and optical exit interface 356 is a. In order to yield incident waveform 208 propagating at an angle β with respect to surface normal 358, incident waveform is directed to be incident at an angle b with respect to surface normal 352 of entry interface 354. In configuring a system for terahertz radiation generation, the angle b is a geometrical parameter that can be dynamically varied in order to affect the efficiency of the generation process.

The angle b can be determined if various parameters of right-angled prism 302 and TGM 210 are known. The parameter $n_{THz}$ represents the refractive index of TGM 210 at the wavelength of the generated terahertz radiation and the parameter n represents the refractive index of TGM 210 at the wavelength of incident waveform 208. Similarly, if the parameter $n_p$ is the refractive index of prism 302 at the wavelength of incident waveform 208, then the incidence angle b can be calculated according to $$b = \sin^{-1}\left[n_p \sin\left[\sin^{-1}\left(\frac{n^2}{n_{THz}n_p}\right) - a\right]\right] \quad (3)$$

In general, the angle β that incident waveform 208 makes with normals to both surface 306 and 304 is dependent upon the material selected for TGM 210. For EO crystals such as LN and LT, for example, the angle β is typically in a range of about 15 degrees to about 35 degrees. However, for other materials, the angle β may fall outside this range. For example, if SBN is used in TGM 210, then $n_{THz}$ is about 60 and n is about 2.3 for an 800 nm incident waveform 208. The corresponding Cherenkov angle θ is about 88 degrees, so that incident waveform 208 makes an angle β of about 2 degrees with normals to surfaces 306 and 304. That is, incident waveform 208 is directed to be incident on TGM 210 at nearly normal incidence to surface 306. In this case, prism 302 may not be required in order direct incident waveform 208. For a 600 μm thick SBN crystal, the position of incident waveform 208 is displaced laterally (i.e., in the x-direction) by about 46 μm after each round-trip between surfaces 306 and 304.

In contrast, for materials having $n_{THz}$ less than the value of $n_{THz}$ for LN and/or LT, the angle β may be larger than 35 degrees. Where the value of β is very large (i.e., greater than 45 degrees), it may be preferable in some embodiments to introduce incident waveform 210 into TGM 210 via a surface other than surface 306. For example, in the embodiment shown in FIG. 3, incident waveform 208 may be introduced into TGM 210 through the left-hand surface.

In general, any surface of TGM 210 can have an anti-reflection coating applied thereto. For example, surfaces 304 and/or 306 can be coated with one or more anti-reflection materials. Other surfaces of TGM 210 can also be coated, as can surfaces of other optical elements such as prism 302. Generally, the anti-reflection coating(s) used can be chosen to reduce the intensity of a reflected portion of incident light (e.g., incident waveform 208) from the coated surfaces. The anti-reflection coating(s) can be selected to reduce reflections from surfaces for a range of angles of incidence of incident radiation, and/or for a range of wavelengths of incident radiation.

Front surface 306 and back surface 304 of TGM 210 are substantially parallel surfaces, and each is coated with a material having a high reflection efficiency at the wavelength of incident waveform 208. As a result, when incident waveform 208 enters the EO crystal of the present embodiment, the waveform reflects repeatedly from the back surface 304 and front surface 306 of the crystal. Incident waveform 208 can, for example, make three or more passes across TGM 210 between surfaces 306 and 304 (e.g., 10 or more passes, 50 or more passes, 100 or more passes). On each pass across the crystal, the waveform propagates forward or backward at the same angle β relative to the front or back crystal surfaces because the surfaces are substantially parallel. Terahertz polariton field components that are generated during each reflection through the crystal are positioned and timed precisely such that they are in phase with field components that were generated on previous passes of incident waveform 208 through the crystal. That is, the terahertz polariton field components generated near the front surface of the EO crystal by the incident waveform as it is reflected back and forth in the crystal will all be in phase, and similarly, field components generated near the middle of the crystal will be in phase with one another, as will be components near the back of the crystal be in phase with one another. The process of terahertz generation therefore employs a type of phase matching different from conventional phase matching schemes. However, the technique is effective because incident waveform 208 is re-used many times (due to the multiple internal reflections from surfaces 304 and 306) for the generation of terahertz polariton field components. The field components are superposed constructively at each spatial position from front surface 306 to back surface 304 to produce terahertz radiation 212 that has an amplitude and an intensity larger than the amplitude and intensity of the terahertz radiation produced in any one region of the EO crystal.

As a result of the superposition of terahertz polariton field components which occurs in TGM 210, terahertz radiation 212 is constructively enhanced in TGM 210. That is, the field amplitude of the constructively enhanced terahertz radiation 212 is larger than the field amplitude of terahertz radiation generated by a single pass of incident waveform 208 through TGM 210. As a result of constructive enhancement of terahertz radiation 212, in some embodiments, the field amplitude of the constructively enhanced terahertz radiation 212 is larger by a factor of 1.2 or more (e.g., by a factor of 1.5 or more, by a factor of 1.8 or more, by a factor of 2.0 or more, by a factor of 2.5 or more, by a factor of 3.0 or more, by a factor of 3.5 or more, by a factor of 4.0 or more) than the field amplitude of terahertz radiation produced from a single pass of incident waveform 208 through TGM 210. In certain embodiments, the single-pass amplification factor—the factor by which the amplitude of the constructively enhanced terahertz radiation 212 is increased on each successive pass of incident waveform 208 through TGM 210—can be 1.1 or more (e.g., 1.2 or more, 1.3 or more, 1.4 or more, 1.5 or more 1.6 or more, 1.7 or more, 1.8 or more, 1.9 or more, 1.95 or more, 1.99 or more).

In some embodiments, surfaces 304 and/or 306 of TGM 210 are left uncoated, and incident waveform 208 reflects from the uncoated surfaces to make multiple passes through TGM 210. In general, uncoated surfaces have lower reflectivities at the optical wavelengths of incident waveform 208 than surfaces coated with high reflectivity materials, and so a larger fraction of the light intensity of incident waveform 208 is transmitted through uncoated surface(s) 304 and/or 306. However, under certain circumstances, it is possible to achieve high reflectivity from uncoated surfaces 304 and/or 306. For example, if the propagation angle β that incident waveform 208 makes with normals to surfaces 304 and 306 is larger than or equal to the critical angle $\theta_c$ for total internal reflection of incident waveform 208 in TGM 210 (or even slightly smaller than $\theta_c$), then the reflectivity of surfaces 304 and 306 with respect to incident waveform 208 can be relatively larger. As an example, for a TGM that includes a LiNbO$_3$ crystal stoichiometrically doped with MgO, the Cherenkov condition yields a propagation angle β≈25°. For this TGM, the critical angle for total internal reflection of an incident waveform 208 having a central wavelength of 800 nm is about 27.5°. For this waveform incident upon uncoated surfaces 304 and 306 of the TGM, the experimentally measured reflection coefficient for each surface is about 0.7. Therefore, waveform 208 can make multiple passes through TGM 210, reflecting from surfaces 304 and 306 even though these surfaces are not coated with a high reflectivity material.

In general, for any of the embodiments disclosed herein, surfaces 304 and/or 306 can be either coated or uncoated. As discussed above, in some circumstances, the reflectivity of uncoated surfaces can be lower than the reflectivity of coated surfaces. However, in other circumstances, such as when β is larger than $\theta_c$, the reflectivity of the surfaces can be very high even though coatings may not be used. In fact, in certain circumstances, total internal reflection of waveform 208 at surfaces 304 and/or 306 may lead to a higher reflectivity than would otherwise result from applying reflective coatings to these surfaces. Typically, to ensure that incident waveform 208 is reflected relatively efficiently from surfaces 304 and/or 306 when these surfaces are left uncoated, as discussed above, β is $0.8 \cdot \theta_c$ or larger (e.g., $0.9 \cdot \theta_c$ or larger, $0.95 \cdot \theta_c$ or larger, $\theta_c$ or larger, $1.1 \cdot \theta_c$ or larger, $1.2 \cdot \theta_c$ or larger, $1.5 \cdot \theta_c$ or larger, $1.75 \cdot \theta_c$ or larger, $2 \cdot \theta_c$ or larger).

As an example of the efficiency of the terahertz radiation generation process, in a TGM such as a 1 mm thick (from front surface 306 to back surface 304) LN crystal, an incident waveform 208 that includes a single 50 fs, 1 mJ optical pulse at 800 nm, cylindrically focused to a 50 μm wide line (5 mm high), may yield a pulse of terahertz radiation having a pulse energy of about 1 nJ after one pass of incident waveform 208 across TGM 210 from front surface 306 to back surface 304. The single-pass conversion efficiency of this process is about $10^{-6}$. The single-pass conversion efficiency may increase with increasing crystal thickness, for example, although the Rayleigh range of incident waveform 208 places an upper limit on the conversion efficiency regardless of crystal length. In embodiments, the intensity of incident waveform 208 is generally maintained below the threshold intensity for white-light generation and/or optical damage in TGM 210. For a relatively short-duration incident waveform, this condition may place a limitation on the focused spot size of the waveform in TGM 210. Therefore, it may be advantageous in some embodiments to employ an incident waveform 208 having a somewhat greater duration (e.g., an incident waveform having a duration of about 150 fs rather than about 50 fs) in order to permit focusing of incident waveform 208 to reach a higher fluence within TGM 210. In order to generate relatively low terahertz frequencies such as about 0.1 THz or lower, for example, considerably longer pulse durations and still higher fluence levels could be used.

Neglecting scattering and other loss mechanisms that reduce the amplitude and/or intensity of optical and/or terahertz radiation in the crystal, the terahertz polariton field amplitude will be increased by a factor that is related to the number of reflections of incident waveform 208 through the EO crystal. The terahertz radiation intensity, or total terahertz pulse energy, and therefore the conversion efficiency from optical energy to terahertz energy, will be increased by a factor given by the square of the number of internal reflections.

The thickness of TGM 210 in the z-direction can be chosen as desired. For example, the EO crystal in the present embodiment can be chosen to be sufficiently thin (e.g., from about 5 microns to about 100 microns) so that incident waveform 208, as it is reflected back and forth from front and back surfaces 306 and 304, passes through a substantial fraction of the volume of the EO crystal. In other words, the spatial separation between consecutive reflections may be comparable to the focused spot size of incident waveform 208 within the crystal. Alternatively, a substantially thicker EO crystal may be used (e.g., a crystal having a thickness larger than 100 microns, such as about 200 microns, or about 500 microns, or about 1 mm, or more than 1 mm), in which case a substantial portion of the crystalline volume is not used for terahertz radiation generation since incident waveform 208 does not propagate through those regions.

The thickness of TGM 210 nominally has no effect on the process of phase-matched terahertz radiation generation because in general, incident waveform 208 continues to reflect from surfaces 306 and 304 at the same angle β regardless of the material thickness. In some embodiments, a relatively thick crystal and fewer internal reflections of incident waveform 208 from surfaces 306 and 304 may be employed. In other embodiments, a thinner crystal and a larger number of internal reflections may be used. Ultimately, Rayleigh range considerations may limit the total length of crystalline material through which the optical radiation remains reasonably well focused. Excessive divergence may lead to reduced terahertz generation efficiency per pass and may also therefore lead to less effective constructive superposition among THz field components generated in different passes.

Structures internal to TGM 210, such as resonators, waveguides, and the like, can be sized to substantially confine the generated terahertz radiation to a selected spatial region within TGM 210. For example, a waveguide in a TGM may have a width in the z-direction of FIG. 3 of about 100 μm or less in order to provide for the confinement. Alternatively, internal structures such as resonators, waveguides, and the like may have widths larger than 100 microns.

In some embodiments, TGM 210 and internal structures therein such as resonators and waveguides may further have thicknesses in the y-direction of FIG. 3 of about 100 microns or less in order to provide for spatial confinement of generated terahertz radiation. In other embodiments, these thickness parameters of TGM 210 and structures therein may be larger than about 100 microns. For example, if relatively high terahertz pulse energies are desired, the thickness of TGM 210 in the y-direction can be relatively large (e.g., 100 microns or more, 200 microns or more, 300 microns or more, 500 microns or more, 1 mm or more).

In some embodiments, particularly when a thicker TGM is used (such as a TGM having a thickness in the z-direction larger than about 100 microns), an incident waveform 208 that includes multiple optical beams, each including one or more optical pulses, can be used in order to generate terahertz radiation from a larger fraction of the available volume of TGM 210. FIG. 5 is a schematic diagram of a plan view of an embodiment wherein an incident waveform 208 that includes multiple delayed ultrashort optical pulses is used to produce terahertz radiation. The individual optical pulses are denoted by the black arrows in the figure, and all are directed into an EO crystal (TGM 210) using prism 302 at an angle β to a surface normal of front surface 306. Each of the optical pulses propagates through the crystal, reflecting multiple times from the front surface 306 and back surface 304. Each successive optical pulse in incident waveform 208 is temporally delayed and spatially offset relative to its predecessor, as shown in the figure, such that the terahertz polariton field components generated by each pulse within a particular spatial region of the EO crystal are temporally in phase with the field components in that particular spatial region generated by each of the other optical pulses. As a result, all of the terahertz field components add constructively to produce a terahertz radiation field having an amplitude that is larger than the terahertz field amplitude generated by any one of the pulses individually. This process represents a type of phase matching similar to the process described above in connection with FIG. 3. However, this type of phase matching by itself, without regard to the precise angle of incidence into the TGM and without the use of multiple reflections from the surfaces on the front and back TGM faces, does not involve re-use of optical radiation after a single pass through the TGM. In the present embodiment, each of the incident optical pulses is re-used as the pulses reflect successively from the front and back surfaces of the crystal, generating additional terahertz radiation on every pass through the crystal. The set of spatially and temporally shifted optical pulses effectively forms a tilted incident optical pulse front, and the tilt angle of the pulse front can be adjusted (e.g., by adjusting the spatial and temporal separations between the optical pulses) to increase constructive enhancement of the terahertz radiation generated within TGM 210.

Generation of an incident waveform 208 that includes multiple spatially and temporally offset ultrashort pulses can be performed using a variety of techniques. FIGS. 6A-6C are schematic diagrams showing plan views of three different means for providing a suitable incident waveform. In FIG. 6A, optical waveform 204, which includes a single ultrashort optical pulse derived from source 202, is directed into a spatiotemporal pulse shaper 402. Spatiotemporal pulse shaper 402 can include, for example, a spatial light modulator, spatial masks, diffractive optical elements such as diffraction gratings and/or binary phase masks, and/or other devices or elements configured to modify the temporal and/or spatial characteristics of optical waveform 204. Spatiotemporal pulse shaper 402 can be configured manually, for example, or the configuration of spatiotemporal pulse shaper 402 can be adjusted automatically and/or iteratively using control signals produced by electronic processor 224. The signals produced by electronic processor 224 may be calculated in order to produce a desired result such as, for example, to increase an intensity of the terahertz radiation 212 produced.

Alternatively, FIG. 6B illustrates a different technique for producing multiple spatially- and temporally-offset optical pulses from a single ultrashort pulse in optical waveform 204. Prism 404 is used to direct optical waveform 204 into reflecting block 406. Front surface 408 of reflecting block 406, except for a portion of the surface in a region 414 where optical waveform 204 enters reflecting block 406, is coated with a high-reflectance material so that when light having a wavelength of optical waveform 204 is incident on surface 408, substantially all of the incident light is reflected by the surface. Back surface 410 of reflecting block 406 is coated with a material having a reduced reflectivity relative to the coating on front surface 408. For example, back surface 410 may have a reflectivity of about 95% for incident light having a wavelength of optical waveform 204. When optical waveform 204 enters reflecting block 406 through region 414, optical waveform 204 reflects multiple times from front and back surfaces 408 and 410 of the reflecting block. Due to the coatings on each surface, when optical waveform 204 is incident on front surface 408, substantially all of the optical radiation incident on surface 408 is reflected. When optical waveform 204 is incident on back surface 410, a portion of the incident radiation is transmitted and a portion is reflected back toward front surface 408. Each transmitted portion is spatially offset from the preceding transmitted portion due to an additional round-trip inside reflecting block 406. The additional round-trip also provides a temporal delay between successive transmitted portions. If optical waveform 204 includes a single ultrashort optical pulse prior to entering prism 404, for example, then the transmitted portions collectively include multiple single optical pulses, each pulse spatially and temporally offset from the other pulses. In some embodiments, the coating on back surface 410 can provide a spatially-varying reflectivity so that all of the output pulses in incident waveform 208 have similar energies. In the geometry shown, the spatial and temporal offset of each of the transmitted pulses is nominally the same. The transmitted pulses are further collectively directed by prism 412 to be incident on TGM 210 in a selected direction as incident waveform 208. In some embodiments, prism 412 may be omitted.

FIG. 6C shows an alternative means for generating an incident waveform that includes multiple spatially and temporally delayed pulses. A large-diameter optical waveform 204 that includes a single ultrashort optical pulse is incident on an echelon structure having a "stair-step" profile of stepwise-increasing thickness across the profile of optical waveform 204. The echelon structure is fabricated from a material such as glass having an index of refraction larger than the index of refraction of air. As a result, an optical pulse passing through a portion of the echelon structure will be delayed by an amount that corresponds to the thickness of that portion of the echelon structure. Spatial regions of optical waveform 204 near the left hand edge, such as region 418, pass through either no portion or a relatively thin portion of the echelon structure and are delayed by only a small amount. Spatial regions of optical waveform 204 near the right hand edge, such as region 420, pass through a relatively thick portion of the echelon structure and are delayed by a larger amount. The widths of the echelon steps across the profile of optical waveform 204 are nominally equal, as are the step thicknesses in the direction of propagation of optical waveform 204, so that incident waveform 208 is produced with spatially offset portions having temporal delays of nominally the same amount from one portion to the next.

In the embodiments shown in FIGS. 6A-6C, incident waveform 208 can further be directed to be incident on one or more additional optical elements such as lenses, mirrors, prisms, and the like, prior to being incident on TGM 210.

In other embodiments, other schemes can be employed to produce a suitable incident waveform 208. For example, multiple beamsplitters and reflective elements such as mirrors can be used to generate, from a single ultrashort optical pulse, a series of variably spatially and temporally offset optical pulses. In general, the first and last of the multiple optical pulses in incident waveform 208 can be separated by a temporal interval of about a nanosecond in some embodiments. In other embodiments, the duration of the temporal window can be larger or smaller than a nanosecond.

In general, the spatiotemporal profile of incident waveform 208 can be adjusted to control the efficiency with which optical radiation generates terahertz radiation in TGM 210. The method by which the spatiotemporal profile of incident waveform 208 is adjusted depends upon the methods used to produce waveform 208. For example, if waveform 208 is produced using an echelon structure, then thicknesses of the echelon steps can be changed to control the profile of waveform 208. Alternatively, or in addition, if a spatiotemporal pulse shaper is used to produce waveform 208, then both the amplitude and phase of waveform 208 can be changed in a controller manner. Typically, the spatiotemporal profile of incident waveform 208 is adjusted to improve the efficiency of conversion of optical radiation to terahertz radiation. This adjustment can be part of a feedback loop, for example, where the terahertz radiation is monitored and a feedback signal is returned and is used to alter the spatiotemporal profile of waveform 208 to further improve conversion efficiency.

In some embodiments, the spatiotemporal profile of incident waveform 208 can, alternatively or in addition, be altered to change one or more properties of the terahertz radiation field. For example, in response to a measurement of the terahertz radiation field, either within TGM 210 or after the terahertz radiation has left TGM 210, the spatiotemporal profile of incident waveform 208 can be modified. Because the spatial and temporal profiles of the terahertz radiation depend on the spatiotemporal profile of waveform 208, the profile of the terahertz radiation changes when the spatiotemporal profile of waveform 208 is modified. Accordingly, amplified terahertz radiation fields with particular spatiotemporal characteristics can be produced by altering the spatiotemporal characteristics of waveform 208 (see later discussion).

Terahertz radiation produced using embodiments shown in FIG. 3 or FIG. 5 (or in similar embodiments) nominally includes a single-cycle terahertz wave. Multiple-cycle terahertz radiation can also be generated through the use of an optical grating pattern that includes alternate light and dark fringes. An optical grating pattern can be produced, for example, from the interference between two or more optical beams. The beams can be generated and directed with a combination of reflective and refractive optical elements, as discussed above for other embodiments.

Figure 7:
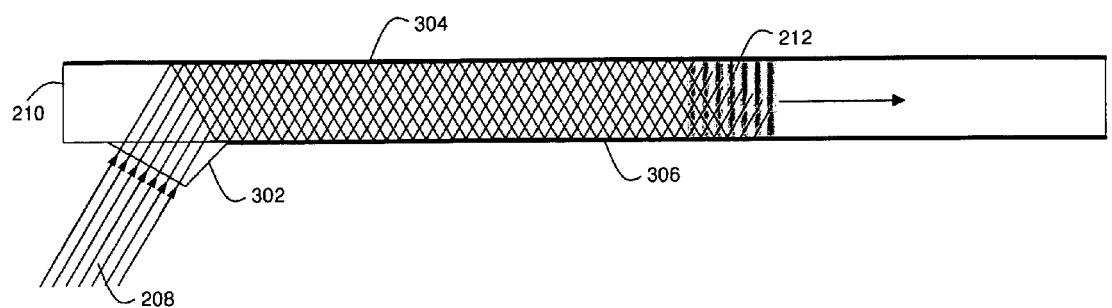
FIG. 7 is a schematic diagram showing a plan view of phase-matched generation of a multiple-cycle terahertz radiation field.

FIG. 7 is a schematic diagram showing generation of multiple-cycle terahertz radiation 212 using a suitably configured incident waveform 208. Many of the elements of FIG. 7 are similar to elements of FIG. 5, for example, and therefore will not be discussed further. Incident waveform 208 includes multiple spatially offset optical pulses, as in FIG. 5. However, the multiple pulses, designated with arrows in FIG. 7, are temporally coincident prior to entering prism 302. Due to the angle of entry into TGM 210, each pulse enters TGM 210 at a different time and produces its own terahertz radiation field, but the terahertz fields due to different optical pulses do not all add constructively to produce a single-cycle terahertz field. Instead, each optical pulse produces a fringe in the overall multiple-cycle terahertz radiation field 212. Incident waveform 208 can therefore be considered to provide a type of grating excitation in TGM 210. The terahertz radiation wavelength is related to the optical fringe spacing provided by incident waveform 208, and the terahertz radiation wavelength and frequency may be tuned by varying the optical fringe spacing. The optical grating pattern is generally incident on surface 306 of TGM 210 at an angle $\beta$ to a surface normal, and therefore the terahertz radiation wavelength is determined by the ratio of the optical fringe spacing to the cosine of the angle $\beta$. In general, the number of cycles in terahertz radiation 212 is determined by the number of fringes in the optical grating pattern inside TGM 210.

Another embodiment that provides multiple-cycle terahertz radiation is similar to the embodiment shown in FIG. 3. However, incident waveform 208 is configured to include multiple optical pulses, rather than the single optical pulse discussed in reference to FIG. 3. In this embodiment, the temporal profile of incident waveform 208 is used to determine the frequency and number of cycles of terahertz radiation 212. For example, the number of optical pulses in incident waveform 208 determines the number of cycles in terahertz radiation 212, and the frequency of the terahertz radiation is determined by an inverse of the temporal spacing between the optical pulses. The total temporal interval between the first and last of the multiple optical pulses can about a nanosecond in some embodiments. In other embodiments, the total temporal interval can be longer or shorter than a nanosecond.

In general, the use of an optical pulse train in order to produce multiple-cycle terahertz radiation can be employed in other embodiments as well. For example, in the embodiment shown in FIG. 5, wherein incident waveform 208 includes multiple spatially and temporally offset optical pulses in order to produce high-intensity terahertz radiation, each of the optical pulses in incident waveform 208 may be substituted by an optical pulse train produced, for example, using a spatial light modulator. The relative delays of the optical pulses in each of the pulse trains can be selected to be nominally equal in order to produce a high-intensity, multiple cycle terahertz radiation field by superposition of multiple cycle terahertz fields produced by the spatially offset optical pulse trains of incident waveform 208. The frequency of the terahertz radiation field is determined by the temporal spacing of the optical pulses in each of the optical pulse trains.

More generally, both the spatial and temporal profiles of incident waveform 208 may be configured in embodiments in order to generate terahertz radiation field 212 having selected characteristics such as specified amplitude and phase profiles. In some embodiments, TGM 210 can include structural elements into which terahertz radiation 212 propagates and/or within which terahertz radiation 212 is generated using the techniques described herein.

Further, TGM 210 can include structural features that provide for either coupling the terahertz radiation out of TGM 210, or for redirecting the terahertz radiation within TGM 210 to provide for further terahertz field enhancement. For example, when terahertz radiation 212 reaches an edge of TGM 210, such as the right hand edge of the EO crystal in FIG. 3, the radiation can be coupled out of the crystal and into air or into another medium and directed to an application 214. The side of the crystal through which the terahertz radiation is coupled out can be cut at an angle such as the Brewster angle to increase transmission of the radiation through the crystal interface. In terahertz waveguide structures, for example, grating coupling could be used in order to couple terahertz radiation out of TGM 210.

Alternatively, in some embodiments, an edge corresponding to the right hand edge of the crystal in FIG. 3 may be provided with a coating having a high reflectivity (e.g., a gold layer) for radiation at a frequency of terahertz radiation 212, and terahertz radiation 212 may therefore be directed leftward within TGM 210, with phase-matched terahertz radiation generation continuing until terahertz radiation 212 exits from the left hand edge of the crystal. In addition, at various locations along front surface 306 or back surface 304 of TGM 210, the reflective coating can be interrupted and additional optical elements such as prisms can be used to direct additional optical waveforms to enter TGM 210 at suitably chosen angles of incidence. The additional optical waveforms can be used to provide "booster" stages of terahertz radiation generation in order to reach even higher terahertz field amplitudes and pulse energies. The process can additionally be repeated multiple times, with the terahertz radiation field propagating left and right across TGM 210 multiple times, each successive pass either separated by a spatial offset, or occurring in a resonator structure that allows a portion of the terahertz field to be coupled out of the resonator, either through partial transmission on each pass, or by electro-optic or optical switch-out on a selected pass. At some or all of the various locations along front surface 306 of TGM 210, optical radiation within TGM 210 can also be permitted to exit TGM 210. This may be advantageous, for example, if extended propagation within TGM 210 leads to a defocusing (i.e., divergence) of the optical radiation. In some embodiments, the escaped optical radiation may be optically processed by focusing for example, or by introducing a selected temporal delay, and then the optical radiation may be directed to re-enter TGM 210 for further phase-matched terahertz radiation generation. Alternatively, or in addition, the processed optical radiation may be used to generate additional terahertz radiation in TGM 210 in the form of one or more additional terahertz fields (e.g., additional terahertz fields that are not constructively superposed with terahertz radiation 212).

In some embodiments, a high repetition rate source 202 of optical pulses can be used to generate terahertz radiation 212. For example, a mode-locked laser source such as a diode pumped erbium fiber laser source with a repetition rate in a range from about 10 GHz to about 20 GHz can be used to generate continuous or quasi-continuous THz radiation. Optical pulses in these high repetition rate laser sources are separated by about 50-100 ps in some embodiments. BCO 206 can further include spatiotemporal pulse shaping devices to provide high repetition rate optical pulses having desired temporal and/or spatial characteristics for the generation of continuous or quasi-continuous terahertz radiation having selected temporal properties. The output of an erbium fiber laser can be fiber coupled, for example, to an input port of a spatiotemporal pulse shaper, and then further to TGM 210. The generated terahertz radiation can be used for spectroscopic measurement and imaging applications, or for signal processing, for example, and the system used to generate the radiation can be a handheld system; or can otherwise be relatively compact.

TGM 210 can be constructed to form a resonator having a length such that the round-trip time of the terahertz radiation field therein matches the timing between optical pulses from source 202. In addition, in some embodiments, electronic processor 224 can provide a control signal 230 to source 202 to adjust the repetition rate in order to more closely match the optical pulse timing and the terahertz round-trip time. This technique can be used to produce continuous terahertz radiation with high conversion efficiency using a relatively low power optical source. In some embodiments, an optical pulse shaping device such as spatiotemporal pulse shaper 402 can be used to provide a high-repetition rate pulsed source for continuous or quasi-continuous terahertz radiation generation with specified terahertz waveform characteristics.

Figure 8:
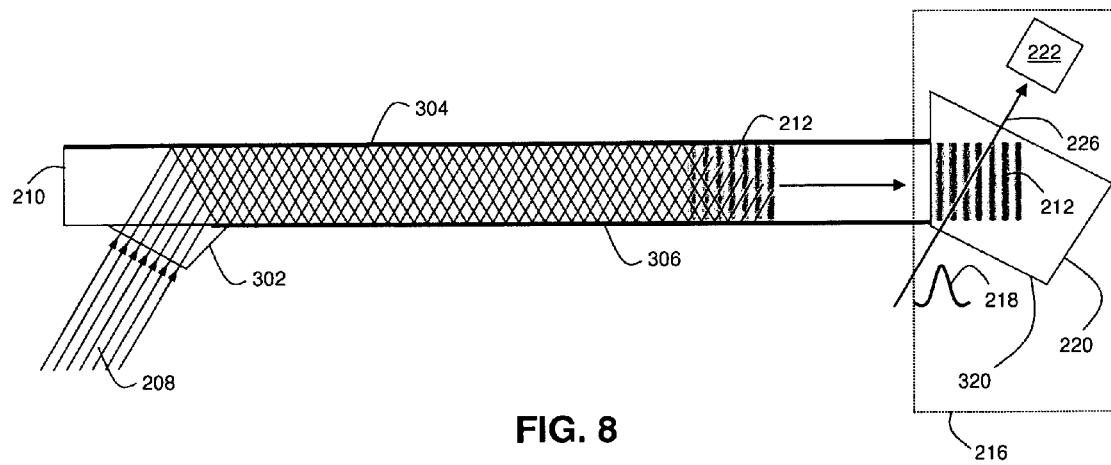
FIG. 8 is a schematic diagram showing a plan view of a measurement system for detecting a terahertz radiation field.

Terahertz radiation fields produced using any of the foregoing techniques can generally be monitored using measurement system 216. Measurement system 216 may embody one or more of a variety of methods for detecting the terahertz radiation, either inside or outside TGM 210. For example, optical probe beam 218 can include one or more probe pulses, and the one or more probe pulses will generally not be phase-matched for detection of terahertz radiation field components from front surface 306 to back surface 304 of TGM 210. However, phase matching of the one or more probe pulses with the terahertz field can be achieved through various methods. For example, FIG. 8 is a schematic diagram of an embodiment of measurement system 216. The system includes an electro-optic measurement crystal 220 that is cut so that its entry surface 320 makes an angle given by the Cherenkov angle relative to the front surface 306 of TGM 210. Measurement crystal 220 may be fabricated from the same material as TGM 210, for example, in order to prevent refraction of terahertz radiation 212 on passing through the interface between TGM 210 and measurement crystal 220. A phase-matched interaction between terahertz radiation 212 propagating in measurement crystal 220 and optical probe beam 218 produces modulated optical probe beam 226, which is detected by detector 222. Electronic signals corresponding to modulated optical probe beam 226 and produced by detector 222 can then be further processed by electronic processor 224. In some embodiments, two prisms similar to prism 302 can be provided, one adjacent to front surface 306 of TGM 210 and the other adjacent to back surface 304. Optical probe beam 218 is directed to pass in succession through one of the prisms, through TGM 210 including the generated terahertz radiation 212, and then through the other prism, producing modulated optical probe beam 226 that is detected by detector 222. Measurement crystal 220 may therefore be omitted from the measurement system. If the optical probe beam wavelength is sufficiently different from the wavelength of incident waveform 208, or if surfaces 306 and 304 are uncoated, an interruption in the coatings on surfaces 306 and 304 may not be required in order to admit optical probe beam 218 into TGM 210.

Alternatively, or in addition, the terahertz radiation field can be monitored via other techniques embodied in measurement system 216. For example, measurement system 216 can include a bolometer or a pyroelectric measurement device to measure the total energy of the terahertz radiation field.

Other methods for monitoring the terahertz radiation field include methods for measuring the terahertz radiation after it leaves TGM 210. These methods include, for example, characterizing the terahertz radiation field using a terahertz antenna (e.g., directing the terahertz radiation to be incident on a biased semiconductor surface) and/or measuring the terahertz radiation using another electro-optic material such as ZnTe. As an example, the terahertz radiation field and a probe beam that includes one or more probe pulses can be directed into an electro-optic material such as ZnTe once the terahertz radiation has left TGM 210. By using a probe beam, the waveform profile (e.g., the amplitude and phase) of the terahertz radiation can be determined. The spatiotemporal profile of incident waveform 208 can be adjusted, as discussed previously, to control the waveform profile of the generated terahertz radiation.

In general, a variety of different methods for monitoring terahertz radiation can be implemented in measurement system 216, and the terahertz radiation can be monitored either within TGM 210, or after it leaves TGM 210.

The embodiments shown have provided for reflection of incident waveform 208 from two parallel surfaces 304 and 306 of TGM 210. Surfaces 304 and 306 are sufficiently parallel such that they provide for a desired number of reflections of incident waveform 208 in TGM 210, where terahertz radiation generated by incident waveform 208 on each pass between reflections is superposed constructively with terahertz radiation generated on one or more previous passes. In general, embodiments can provide for reflection of incident waveform 208 from any number of selected surfaces of TGM 210, including side surfaces, so that successive passes of incident waveform 208 through TGM 210 generate terahertz radiation that superposes spatially and temporally in constructive fashion with terahertz radiation generated on previous passes to produce a terahertz radiation field 212 that is larger than the field produced by any single pass of incident waveform 208 through TGM 210.

EXAMPLE

The following example is not intended to limit the scope of the disclosure described in the claims.

A thin LiNbO$_3$ crystal stoichiometrically doped with MgO (which will be denoted MgO:LN) and having a thickness of 200 microns in the z-direction was used as TGM 210. A prism 302 formed of MgO:LN and having two surfaces which intersect at an angle of approximately 25° (which corresponds to the propagation angle β in the TGM) was affixed to surface 306 of TGM 210. The prism covered only a portion of surface 306. A MgO:LN crystal 220 of thickness 2 mm in the z-direction was affixed to surface 304 of TGM 210, opposite to the prism. Surfaces 304 and 306 were left uncoated. Perspective and plan views of the arrangement of these components are shown in FIGS. 9A and 9B, respectively.

A cylindrically focused incident waveform 208 that included a single excitation pulse of energy 1 mJ, duration 300 fs, and central wavelength 800 nm, derived from a Ti:sapphire multipass laser amplifier system, was directed to be incident on the prism and thereby to be coupled into TGM 210 so that the pulse propagated in TGM 210 at the propagation angle β. As shown in FIG. 9B, a portion of the excitation light 208a was coupled out of the TGM by transmission through surface 304 and into crystal 220 (e.g., the portion of incident waveform 208 that is incident on TGM 210 at a location opposite crystal 220 in FIG. 9A). A portion of the excitation light 208b was also reflected from surface 304 and remained within TGM 210, making multiple passes through the TGM via reflection from surfaces 304 and 306 (e.g., the portion of incident waveform 208 that is incident on TGM 210 at a location below crystal 220 in FIG. 9A). The reflection coefficient at surfaces 304 and 306 where the surfaces are not in contact with either crystal 220 or prism 302 (e.g., at MgO:LN-air interfaces) was determined to be about 0.7. This relatively large value of the reflection coefficient at surfaces 304 and 306 arises because the angle of incidence of waveform 208 on each surface (β≈25°) is close to the critical angle for total internal reflection of 800 nm light at a MgO:LN-air interface (about 27.5°). As a result of the relatively large reflection coefficient, significant excitation pulse energy remained even after several reflections of the incident waveform back and forth through TGM 210.

TGM 210, prism 302, and crystal 220 were mounted on a precision rotation stage, and the orientation of these elements with respect to the propagation direction of incident waveform 208 was adjusted to control the efficiency of the pseudo-phasematched terahertz generation process in TGM 210. The extent of amplification of the generated terahertz radiation due to multiple passes of waveform 208 through TGM 210 was assessed via real-space imaging of the terahertz radiation fields, which propagated as polariton waves in TGM 210 and crystal 220. Methods for real-space imaging of polariton fields are disclosed, for example, in R. M. Koehl et al., "Real-space polariton wave packet imaging", *Journal of Chemical Physics* 110: 1317-1320 (1999), the entire contents of which are incorporated herein by reference.

As shown in FIGS. 9A and 9B, a large-diameter probe beam 280 that included a series of variably-delayed, 400 nm probe pulses was directed to be incident on TGM 210. Probe beam 280 was used to image portions of both the top half 210a and the bottom half 210b of TGM 210. Terahertz polariton fields in the top half 210a of TGM 210 were generated, as shown in FIG. 9B, from a single pass of incident waveform 208 through TGM 210. In contrast, terahertz polariton fields in the bottom half 210b of TGM 210 were generated from multiple passes of the incident waveform 208 through TGM 210. As a result, differences in the measured properties of the radiation fields in regions 210a and 210b of TGM 210 were used to assess the extent of amplification in TGM 210.

Space-time plots of the terahertz polariton fields in the top and bottom portions of TGM 210, derived from real-space images of TGM 210, are shown in FIGS. 10A and 10B, respectively. The polariton response to a cylindrically focused excitation pulse is approximately a plane wave, so each individual two-dimensional probe image of TGM 210 (which corresponds to a specific delay time following the excitation pulse in incident waveform 208) can be reduced to a one-dimensional line scan. Multiple line scans corresponding to different time delays can then be combined, in a time-ordered arrangement, to produce the space-time plots shown in FIGS. 10A and 10B. In each plot, the horizontal axis corresponds to position along the x-axis in FIGS. 9A and 9B, and measures the lateral movement of the terahertz polariton field. The vertical axis corresponds to the time delay between the excitation pulse in waveform 208 and the probe pulse used to capture an image of TGM 210. In each plot, the diagonal stripe is due to a single-cycle terahertz polariton field moving in the +x-direction in time. FIG. 10A corresponds to the evolution of a terahertz polariton field in the upper portion 210a of TGM 210. That is, FIG. 10A measures the amplitude of the terahertz polariton field that results from a single pass of waveform 208 through TGM 210, without any amplification of the terahertz field due to multiple reflections of incident waveform 208 within TGM 210. FIG 10B corresponds to the evolution of a terahertz polariton field in the lower portion 210b of TGM 210, and measures the amplitude of the polariton field after multiple passes of incident waveform 208 through TGM 210 have amplified the terahertz field initially generated after the first pass of waveform 208. By examining the differences in pixel intensity values in FIGS. 10A and 10B, the degree of enhancement of the terahertz field amplitude can be assessed.

Analysis of the pixel intensity values indicates that the amplified terahertz field amplitude in FIG 10B is larger by a factor of about 2 than the initial terahertz field amplitude in FIG. 10A. This corresponds to an increase in intensity by about a factor of 4. Thus, amplification of the terahertz field is apparent; however, the predicted amplitude enhancement factor of 3 is not achieved. This may result, for example, from incomplete transmission of the excitation pulse in incident waveform 208 from TGM 210 into crystal 220 in the upper portion 210a of TGM 210. Features of lower intensity appear in the space-time plot in FIG. 10B starting at about 70 ps and 90 ps. These fields are due to left-propagating terahertz polariton fields (e.g., polariton fields that initially propagate in the −x-direction) which eventually reflect from the left edge of TGM 210 and then propagate in the +x-direction and into the area of TGM 210 that is imaged by probe beam 280. These features are much less pronounced in FIG. 10A due to coupling of the left-propagating polariton fields into crystal 220 in the upper portion 210a of TGM 210.

A number of embodiments have been described. Nevertheless, it will be understood that various modifications may be made without departing from the spirit and scope of the disclosure. Accordingly, other embodiments are within the scope of the following claims.

What is claimed is:

1. A method comprising:
   directing optical radiation to make multiple passes across an extended region of an electro-optic material, wherein during each pass the electro-optic material converts a portion of the optical radiation into terahertz radiation,
   wherein the optical radiation is directed into the electro-optic material to cause an amplitude of the terahertz radiation generated from one or more earlier passes of the optical radiation to be constructively enhanced by the terahertz radiation generated from a later pass of the optical radiation.

2. The method of claim 1, wherein the amplitude of the terahertz radiation generated from the one or more earlier passes is constructively enhanced by the terahertz radiation generated from each of multiple later passes of the optical radiation through the electro-optic material.

3. The method of claim 1, wherein the optical radiation is directed to reflect from one or more surfaces of the electro-optic material to cause the multiple passes of the optical radiation across the extended region of the electro-optic material.

4. The method of claim 3, wherein the optical radiation is directed to reflect from opposite surfaces of the electro-optic material to cause the multiple passes of the optical radiation across the extended region of the electro-optic material.

5. The method of claim 3, wherein a portion of each of the one or more surfaces are coated to increase the reflectivity of the optical radiation from the corresponding surfaces of the electro-optic material.

6. The method of claim 3, wherein the optical radiation is directed into the electro-optic material at an angle relative to a surface from which it reflects that causes the terahertz radiation generated from each pass to propagate in a common direction.

7. The method of claim 6, wherein the angle further causes the optical radiation reflected for each later pass to overlap with propagating terahertz radiation generated from one or more earlier passes.

8. The method of claim 6, wherein the angle is complementary to an angle that corresponds to the Cherenkov condition.

9. The method of claim 1, wherein the optical radiation comprises a single beam comprising a single optical pulse having a temporal duration that is short relative to a temporal duration of a single-cycle terahertz output pulse.

10. The method of claim 1, wherein the optical radiation comprises a single beam comprising multiple optical pulses, each one of the multiple pulses having a regular temporal spacing from a previous one of the multiple pulses, wherein the temporal interval between a first one of the multiple pulses and a last one of the multiple pulses is less than a nanosecond, and wherein each one of the multiple pulses has a temporal duration that is short relative to a temporal duration of a single cycle of a multiple-cycle terahertz output waveform having a frequency determined by an inverse of the regular temporal spacing of the multiple optical pulses.

11. The method of claim 1, wherein the optical radiation comprises a single beam comprising multiple optical pulses, each one of the multiple optical pulses having a temporal duration that is short relative to the temporal duration of a single cycle or feature of an output terahertz waveform, wherein the temporal duration of the terahertz waveform is less than a nanosecond.

12. The method of claim 1, wherein the optical radiation comprises a single beam comprising multiple optical pulses, each one of the multiple optical pulses having a temporal duration that is short relative to a duration of a single cycle or feature of an output terahertz waveform, wherein the temporal spacing between the multiple optical pulses produces quasi-continuous terahertz radiation.

13. The method of claim 1, wherein the optical radiation comprises multiple, spatially separated beams each having at least one optical pulse, and wherein the temporal interval between a first one of the optical pulses and a last one of the optical pulses is less than about a nanosecond.

14. The method of claim 1, wherein the optical radiation further comprises one or more additional optical pulses introduced into the electro-optic material at positions along the extended region of the material and configured to further cause an amplitude of terahertz radiation generated from one or more earlier passes of the optical radiation to be constructively enhanced by terahertz radiation generated from the one or more additional optical pulses.

15. The method of claim 13, wherein each of the pulses in a single beam is displaced spatially and temporally from a corresponding pulse in another beam to constructively enhance an amplitude of terahertz radiation generated by the other beam.

16. The method of claim 1, wherein the optical radiation is directed into the material to form an optical interference pattern for each pass, and wherein the pattern spacing and orientation determine the wavelength of the generated terahertz radiation inside the electro-optic material.

17. The method of claim 1, wherein the terahertz radiation propagates within the electro-optic material as an optic phonon-polariton wave having lattice vibrational and electromagnetic wave components.

18. The method of claim 1, wherein the optical radiation is directed into the material through a prism or a grating.

19. The method of claim 1, wherein optical radiation escapes from one or more positions along the extended region of the material following multiple passes across the extended region.

20. The method of claim 1, further comprising coupling the terahertz radiation out of a front, back, or side surface of the electro-optic material.

21. The method of claim 1, further comprising monitoring propagating terahertz radiation produced from the multiple passes.

22. The method of claim 21, wherein the propagating terahertz radiation is monitored when the terahertz radiation is within the electro-optic material.

23. The method of claim 22, wherein additional optical radiation is directed to the electro-optic material to monitor the terahertz radiation.

24. The method of claim 21, further comprising adjusting an angle at which the optical radiation is directed into the electro-optic material based on the monitored terahertz radiation to improve the conversion efficiency of the optical radiation making the multiple passes to generate the propagating terahertz radiation.

25. The method of claim 1, wherein the electro-optic material comprises at least one of a lithium tantalate crystal, a lithium niobate crystal, a strontium barium titanate crystal, and a lead lanthanum zirconate titanate crystal.

26. The method of claim 6, wherein a critical angle for total internal reflection of the optical radiation from the surface is $\theta_c$, and the angle of the optical radiation relative to the surface is 0.8 $\theta_c$ or more.

27. The method of claim 26, wherein the angle of the optical radiation relative to the surface is $\theta_c$ or more.

28. The method of claim 1, wherein the amplitude of the constructively enhanced terahertz radiation is larger than the amplitude of terahertz radiation generated from a single pass of the optical radiation across the extended region of the electro-optic material.

29. The method of claim 28, wherein the amplitude of the constructively enhanced terahertz radiation is at least twice as large as the amplitude of terahertz radiation generated from a single pass of the optical radiation across the extended region of the electro-optic material.

30. The method of claim 1, wherein the amplitude of the terahertz radiation generated from the one or more earlier passes of the optical radiation is increased by a factor of 1.1 or more by the terahertz radiation generated from a later pass of the optical radiation.

31. The method of claim 1, wherein the optical radiation is directed to enter the electro-optic material through one or more surfaces of the electro-optic material that are coated with an anti-reflection material.

32. The method of claim 21, wherein the propagating terahertz radiation is monitored after it has passed out of the electro-optic material.

33. The method of claim 32, wherein a bolometer or pyroelectric detector is used to monitor the terahertz radiation.

34. The method of claim 1, further comprising adjusting the spatiotemporal profile of the optical radiation to improve the conversion efficiency of the optical radiation making the multiple passes to generate the propagating terahertz radiation.

35. The method of claim 1, further comprising adjusting the spatiotemporal profile of the optical radiation to control the spatiotemporal profile of the propagating terahertz radiation.

36. An apparatus comprising:
an electro-optic material for converting optical radiation into terahertz radiation; and
a source of optical radiation, the source being configured to direct the optical radiation to make multiple passes across an extended region of the electro-optic material, wherein during each pass the electro-optic material converts a portion of the optical radiation into terahertz radiation,
and wherein the source is further configured to direct the optical radiation into the electro-optic material to cause an amplitude of the terahertz radiation generated from one or more earlier passes of the optical radiation to be constructively enhanced by the terahertz radiation generated from a later pass of the optical radiation.

37. The apparatus of claim 36, wherein the optical radiation is directed to reflect from one or more surfaces of the electro-optic material to cause the multiple passes of the optical radiation across the extended region of the electro-optic material.

38. The apparatus of claim 37, wherein the optical radiation is directed to reflect from opposite surfaces of the electro-optic material to cause the multiple passes of the optical radiation across the extended region of the electro-optic material.

39. The apparatus of claim 38, wherein a portion of each of the one or more surfaces of the electro-optic material are coated to increase the reflectivity of the optical radiation from the corresponding surfaces of the electro-optic material.

40. The apparatus of claim 36, wherein the electro-optic material comprises at least one of a lithium tantalate crystal, a lithium niobate crystal, a strontium barium titanate crystal, and a lead lanthanum zirconate titanate crystal.

41. The apparatus of claim 37, wherein a critical angle for total internal reflection of the optical radiation at the one or more surfaces is $\theta_c$, and the optical radiation is incident on the one or more surfaces at an angle of 8 $\theta_c$ or more.

42. The apparatus of claim 33, wherein the optical radiation is incident on the one or more surfaces at an angle of $\theta_c$ or more.

43. The apparatus of claim 36, wherein the amplitude of the constructively enhanced terahertz radiation is larger than the amplitude of terahertz radiation generated from a single pass of the optical radiation across the extended region of the electro-optic material.

44. The apparatus of claim 43, wherein the amplitude of the constructively enhanced terahertz radiation is at least twice as large as the amplitude of terahertz radiation generated from a single pass of the optical radiation across the extended region of the electro-optic material.

45. The apparatus of claim 36, wherein the amplitude of the terahertz radiation generated from the one or more earlier passes of the optical radiation is increased by a factor of 1.1 or more by the terahertz radiation generated from a later pass of the optical radiation.

46. The apparatus of claim 36, wherein one or more surfaces of the electro-optic material through which optical radiation enters the electro-optic material are coated with an anti-reflection material.

47. A method comprising:
  directing optical radiation to make multiple passes across an extended region of an electro-optic material, wherein during each pass the electro-optic material converts a portion of the optical radiation into terahertz radiation, wherein the optical radiation is directed into the electro-optic material at an angle relative to a surface from which it reflects to cause an amplitude of the terahertz radiation generated from one or more earlier passes of the optical radiation to be constructively enhanced by the terahertz radiation generated from a later pass of the optical radiation; and
  adjusting the angle to increase the constructive enhancement of the terahertz radiation.

* * * * *

UNITED STATES PATENT AND TRADEMARK OFFICE
CERTIFICATE OF CORRECTION

PATENT NO. : 7,601,977 B2  Page 1 of 1
APPLICATION NO. : 11/638100
DATED : October 13, 2009
INVENTOR(S) : Ka-Lo Yeh et al.

It is certified that error appears in the above-identified patent and that said Letters Patent is hereby corrected as shown below:

Title Page
Column 2, Other Publications, replace "P.Y. Han et als.," with -- P.Y. Han et al., --
Column 2, Other Publications, P.Y. Han reference, replace "for tcrahertz beam" with -- for terahertz beam --

Column 26
Line 44, Claim 41, replace "8 $\theta_c$" with -- 0.8 $\theta_c$ --

Signed and Sealed this

Twenty-fourth Day of November, 2009

David J. Kappos
*Director of the United States Patent and Trademark Office*